(12) United States Patent
Griffin et al.

(10) Patent No.: US 11,008,092 B2
(45) Date of Patent: May 18, 2021

(54) COMPACT DESIGN OF A LIQUID INERTIA VIBRATION ELIMINATION SYSTEM

(71) Applicant: Bell Helicopter Textron Inc., Fort Worth, TX (US)

(72) Inventors: Maurice D. Griffin, Corpus Christi, TX (US); Taeoh Lee, Keller, TX (US); John Frakes, North Richland Hills, TX (US); Michael R. Smith, Colleyville, TX (US); Scott Hemmen, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 779 days.

(21) Appl. No.: 15/796,649

(22) Filed: Oct. 27, 2017

(65) Prior Publication Data

US 2019/0127054 A1 May 2, 2019

(51) Int. Cl.
*F16F 7/10* (2006.01)
*B64C 27/00* (2006.01)
*F16F 15/023* (2006.01)

(52) U.S. Cl.
CPC .......... *B64C 27/001* (2013.01); *F16F 7/1034* (2013.01); *F16F 15/023* (2013.01); *B64C 2027/002* (2013.01)

(58) Field of Classification Search
CPC ...... F16F 7/1034; F16F 15/005; F16F 15/023; F16F 13/08; F16F 13/26; B64C 27/001

USPC ...... 188/378–380, 322.22; 244/17.21, 17.23, 244/17.27, 54; 267/136, 140.13
See application file for complete search history.

(56) References Cited

U.S. PATENT DOCUMENTS

| | | | |
|---|---|---|---|
| 4,236,607 A | 12/1980 | Halwes et al. | |
| 5,435,531 A | 7/1995 | Smith et al. | |
| 5,439,082 A | 8/1995 | McKeown et al. | |
| 5,704,596 A | 12/1998 | Smith et al. | |
| 6,009,983 A | 1/2000 | Stamps et al. | |
| 6,022,600 A | 2/2000 | Schmidt et al. | |
| 6,293,532 B2* | 9/2001 | McGuire | F16F 13/08 267/140.13 |
| 6,431,530 B1* | 8/2002 | Stamps | F16F 1/38 267/136 |
| 6,695,106 B2 | 2/2004 | Smith et al. | |
| 8,240,641 B2* | 8/2012 | McGuire | F16F 13/06 267/33 |
| 8,499,907 B2* | 8/2013 | Smith | F16F 13/26 188/378 |
| 10,550,907 B2* | 2/2020 | Seifert | B64C 27/001 |
| 2014/0064922 A1* | 3/2014 | Smith | B64C 27/001 415/118 |
| 2014/0217232 A1* | 8/2014 | Griffin | F16F 13/08 244/54 |

* cited by examiner

*Primary Examiner* — Christopher P Schwartz
(74) *Attorney, Agent, or Firm* — Lightfoot & Alford PLLC

(57) ABSTRACT

A piston for use in a liquid inertia vibration elimination ("LIVE") system. The piston includes a port that extends from a first end of the piston to an opposite second end of the piston, wherein a length of the port is longer than a length between the first and second ends of the piston.

20 Claims, 9 Drawing Sheets

COMPACT DESIGN OF A LIQUID INERTIA VIBRATION ELIMINATION SYSTEM

BACKGROUND

The present disclosure relates in general to vibration control. More specifically, the present disclosure relates to a novel compact design of an apparatus for isolating mechanical vibrations in structures or bodies that are subject to harmonic or oscillating displacements or forces. The apparatus of the present disclosure is well suited for use in the field of aircraft, in particular, helicopters and other rotary wing aircraft.

For many years, effort has been directed toward the design of an apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the aircraft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all the components which are present in the existing vibration-isolation systems.

A marked departure in the field of vibration isolation, particularly as applied to aircraft and helicopters is disclosed in U.S. Pat. No. 4,236,607, titled "Vibration Suppression System," issued on Dec. 2, 1980, to Halwes, et al. ("Halwes '607"). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in U.S. Pat. No. 5,439,082, titled "Hydraulic Inertial Vibration Isolator," issued on Aug. 8, 1995, to McKeown, et al. ("McKeown '082"). McKeown '082 is incorporated herein by reference. An example of the former is found in U.S. Pat. No. 6,022,600, titled "High-Temperature Fluid Mounting", issued on Feb. 8, 2000, to Schmidt et al. ("Schmidt '600"). Schmidt '600 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in U.S. Pat. No. 6,009,983, titled "Method and Apparatus for Improved Vibration Isolation," issued on Jan. 4, 2000, to Stamps et al. ("Stamps '983"). In Stamps '983, a compound radius at each end of the tuning port was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in U.S. Pat. No. 5,435,531, titled "Vibration Isolation System," issued on Jul. 25, 1995, to Smith et al. ("Smith '531"). Smith '531 is incorporated herein by reference. In Smith '531, an axially extendable sleeve is used in the inner wall of the tuning port in order to change the length of the tuning port, thereby changing the isolation frequency. Another development in the design of tunable Halwes-type isolators was disclosed in U.S. Pat. No. 5,704,596, titled "Vibration Isolation System," issued on Jan. 6, 1998, to Smith et al. ("Smith '596"). Smith '596 is incorporated herein by reference. In Smith '596, a sleeve is used in the inner wall of the tuning port in order to change the cross sectional area of the tuning port itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued on Feb. 24, 2004, to Smith et al ("Smith '106"). Smith '106 is incorporated herein by reference.

An additional development in the area of vibration isolation is the external tuning port disclosed in U.S. patent application Ser. No. 15/240,797, titled "Liquid Inertia Vibration Elimination System," filed on Aug. 18, 2016, which is incorporated herein by reference. Although the foregoing developments represent great strides in the area of vibration isolation, the desire for more compact designs remains.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure provides a liquid inertia vibration elimination ("LIVE") system having a compact design. The compact design is made feasible by the inclusion of a nonlinear tuning port passing through a piston of the LIVE system. The nonlinear tuning port allows for a greater tuning mass that may travel a distance greater than the height of the piston through which the port passes.

Figure 1:
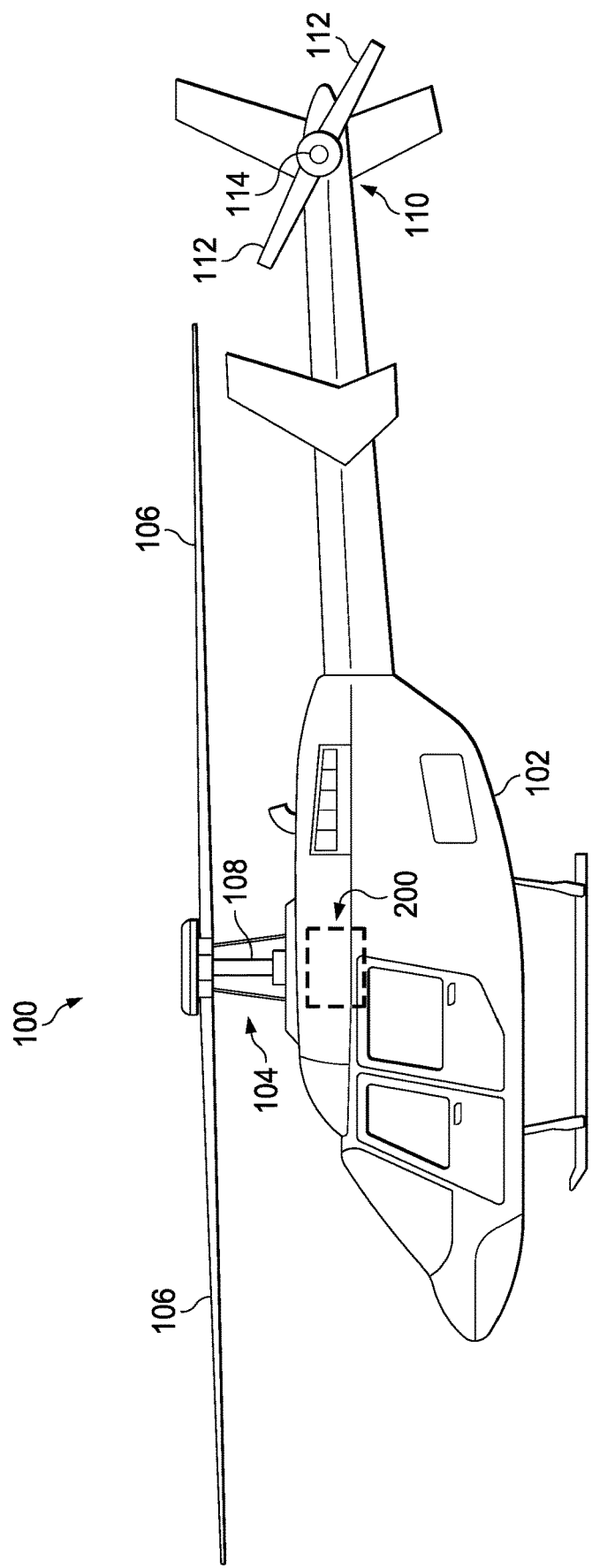
FIG. 1 is a side view of a helicopter including a liquid inertia vibration elimination ("LIVE") system according to an embodiment of this disclosure.
Figure 2:
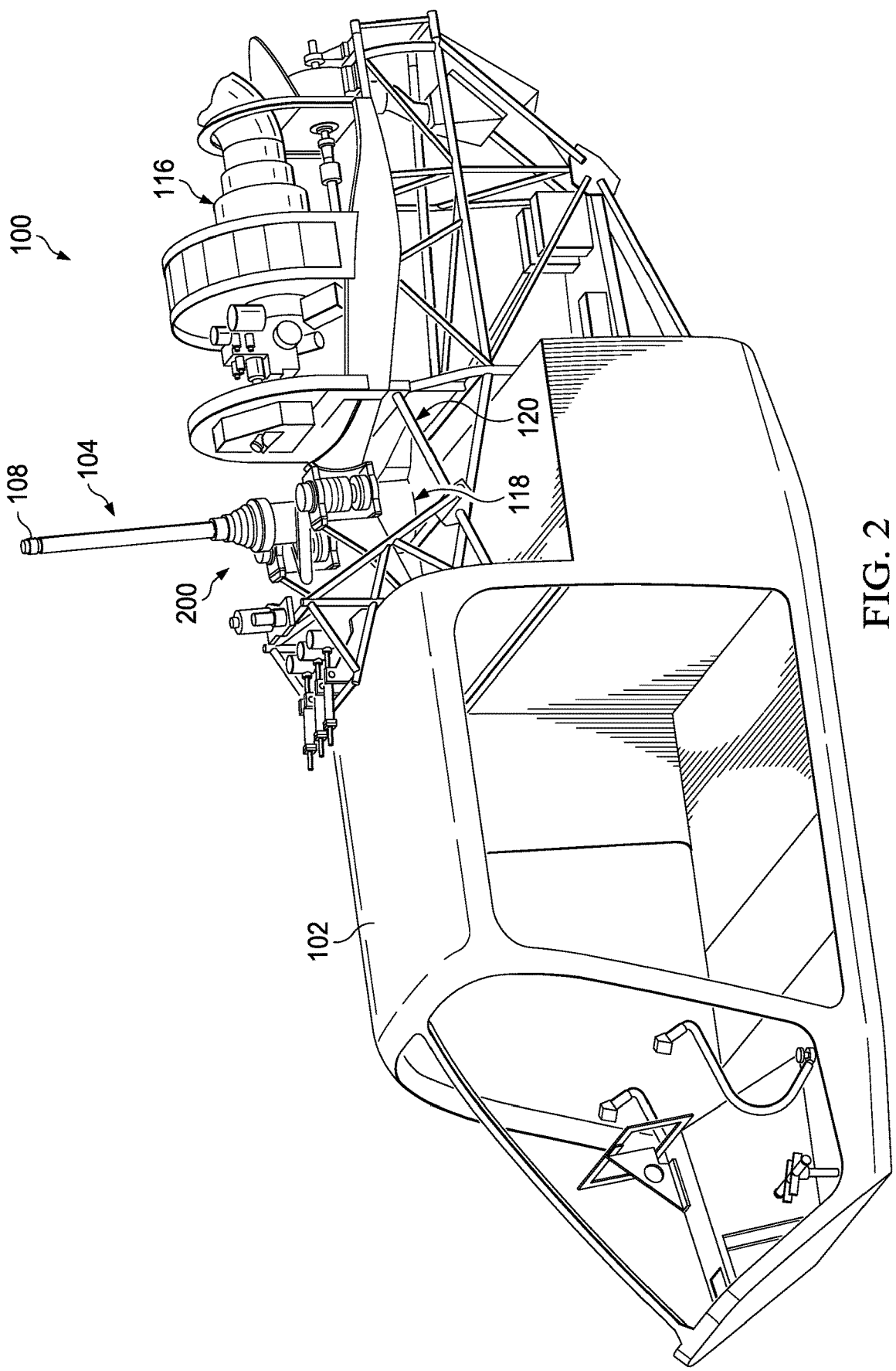
FIG. 2 is an oblique view of a portion of the helicopter of FIG. 1 showing the LIVE system.

Referring now to FIGS. 1 and 2 in the drawings, a helicopter 100 according to the present disclosure is illustrated. Helicopter 100 comprises a fuselage 102 and a main rotor assembly 104, including main rotor blades 106 and a main rotor shaft 108. Helicopter 100 comprises a tail rotor assembly 110, including tail rotor blades 112 and a tail rotor shaft 114. Main rotor blades 106 generally rotate about a vertical axis of main rotor shaft 108. Tail rotor blades 112 generally rotate about a lateral axis of tail rotor shaft 114. Helicopter 100 further comprises two LIVE systems 200 according to the present disclosure for isolating fuselage 102 or other portions of helicopter 100 from mechanical vibrations, such as harmonic vibrations, which are associated with the propulsion system and which can arise from an engine 116, transmission 118, and rotor assemblies 104, 110 of helicopter 100.

Figure 3:
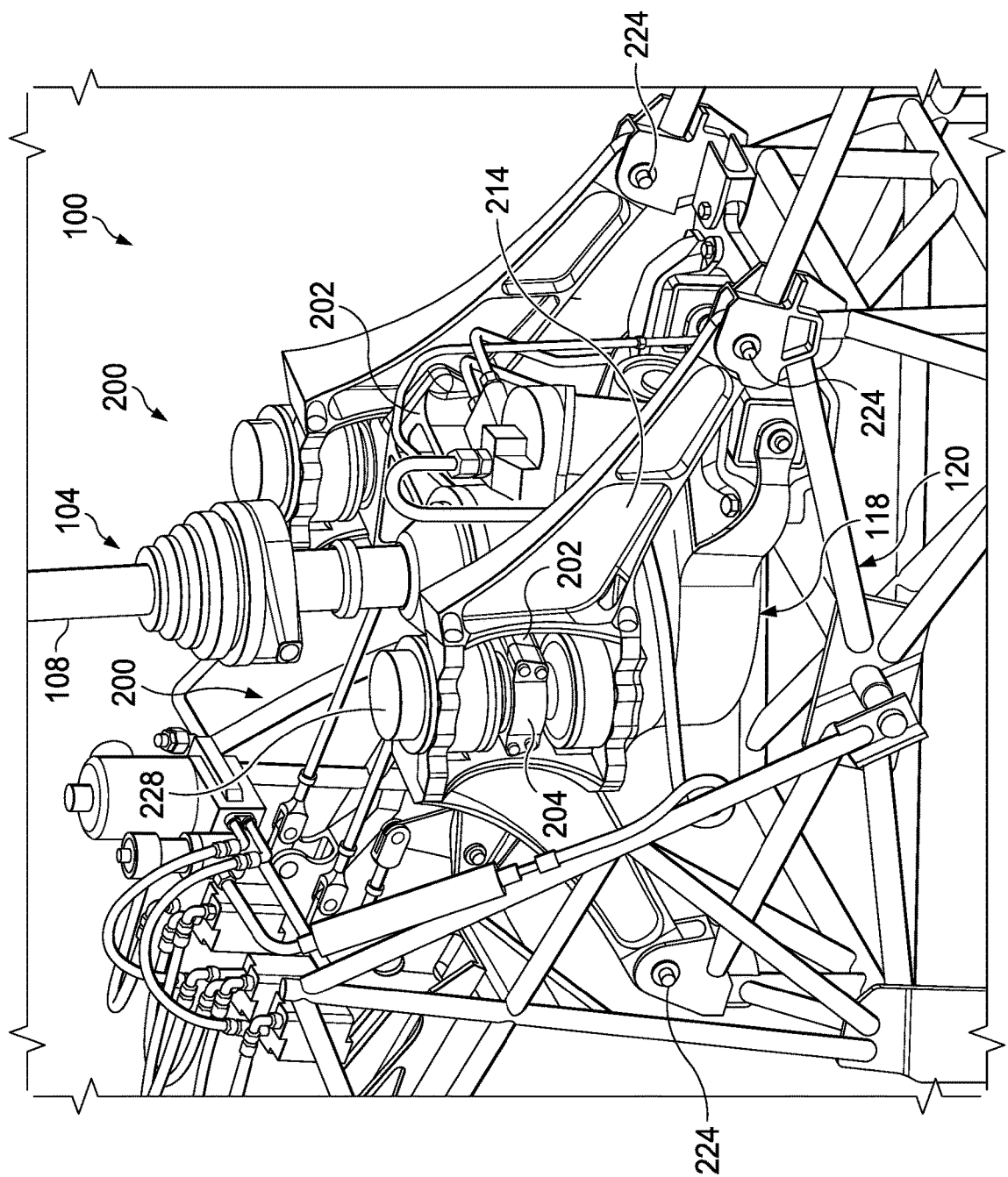
FIG. 3 is an oblique view of a portion of the helicopter of FIG. 1 showing the LIVE system in greater detail.
Figure 4:
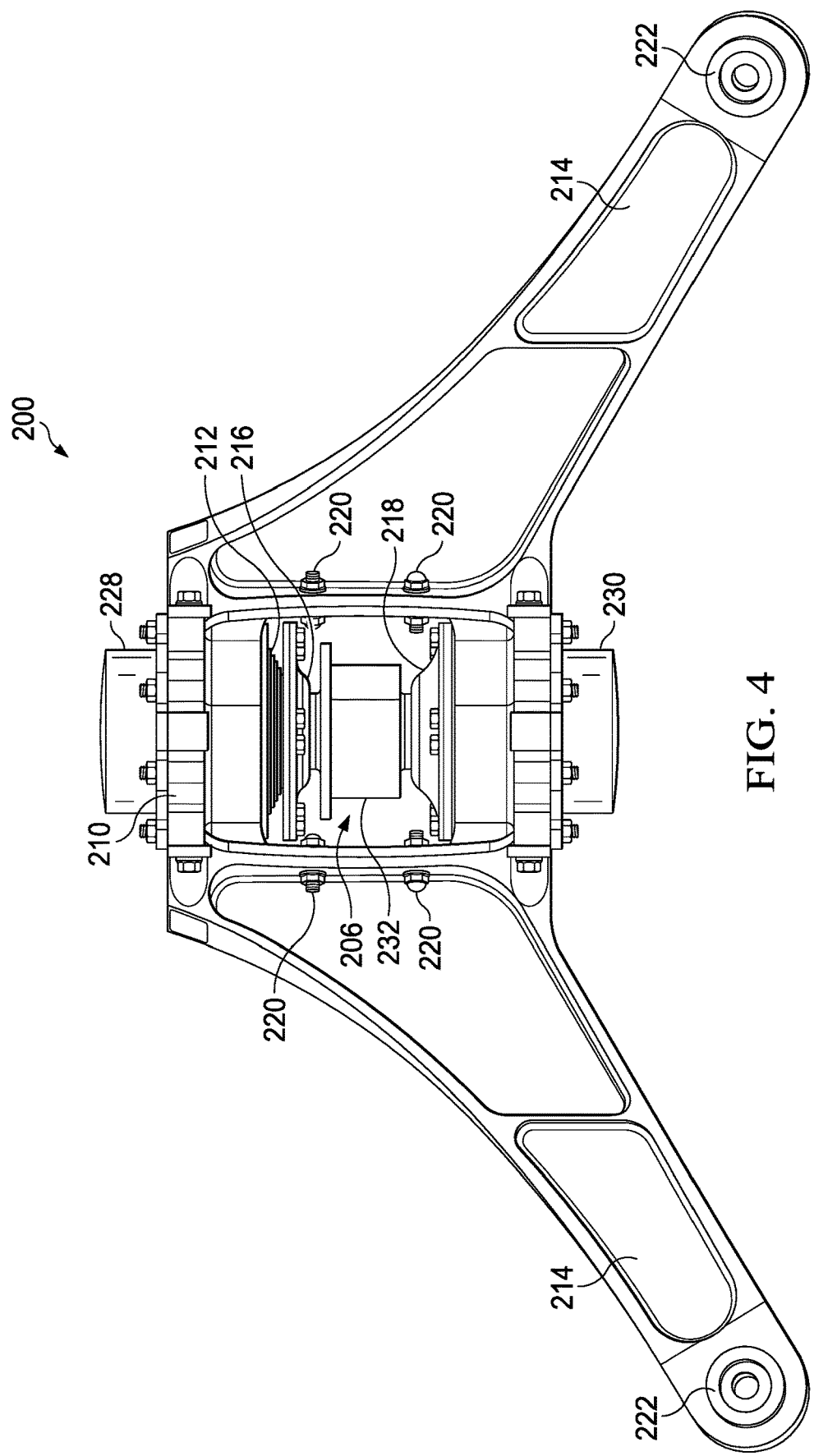
FIG. 4 is a side view of the LIVE systems of FIGS. 1-3.
Figure 5:
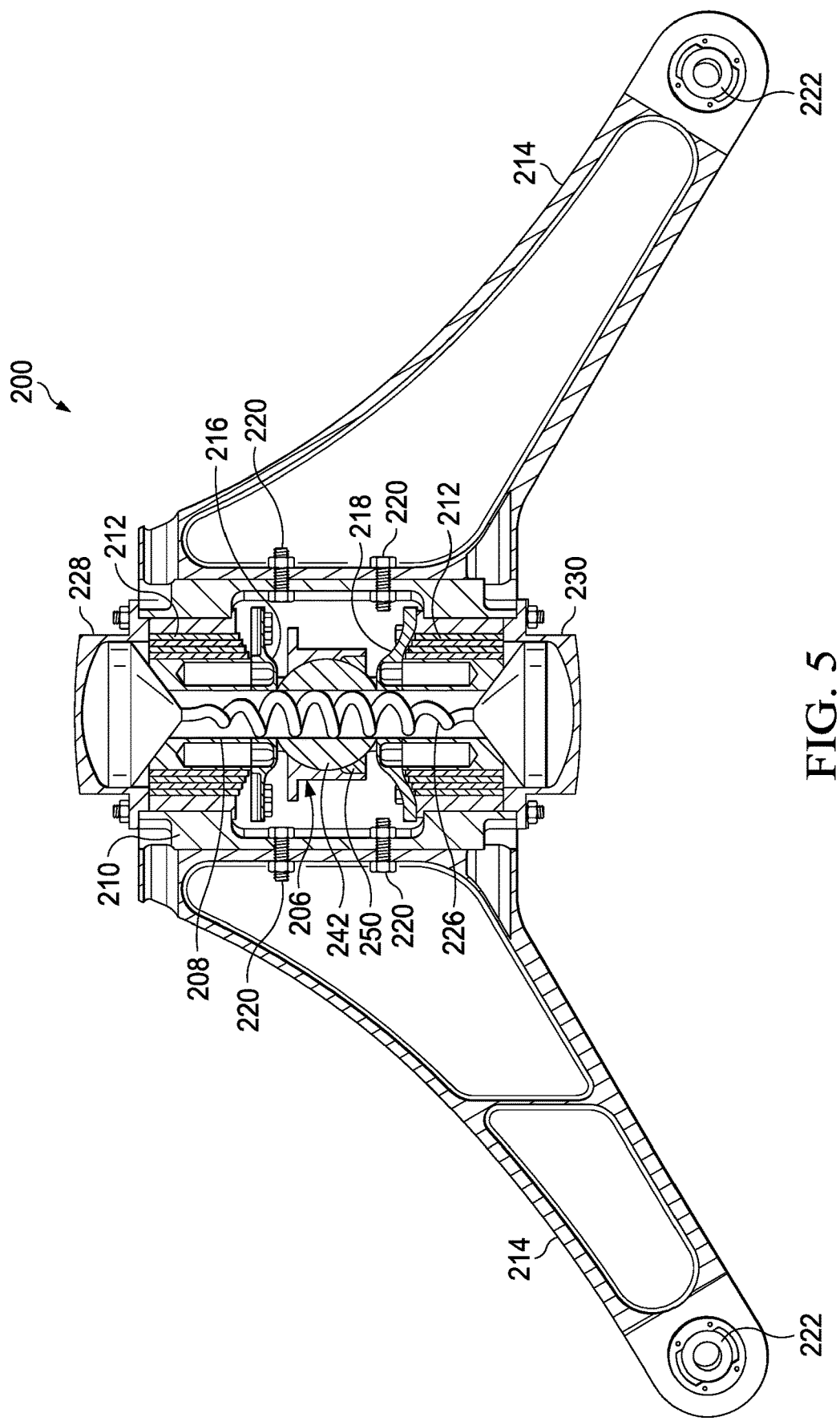
FIG. 5 is a cross-sectional side view of the LIVE system of FIGS. 1-4.

Referring to FIGS. 3-5, transmission 118 is suspended by two LIVE systems 200 that connect to an internal frame 120 of helicopter 100. More specifically, a bridge beam 202 and a complementary bridge cap 204 of each LIVE system 200 are used to capture and connect a spherical center bearing 206 of LIVE system 200 to transmission 118. Spherical center bearing 206 generally receives a piston 208 through a central passage of spherical center bearing 206 (see FIG. 5). LIVE system 200 is further connected to internal frame 120 using a three piece assembly comprising a central bearing housing 210 configured to receive two journal bearings 212 and two legs 214. Spherical center bearing 206 provides pitch compliance for transmission 118 while journal bearings 212 provide vertical compliance. Vertical travel is limited in an upward direction by a shimmable up-stop 216 and limited in a downward direction by a shimmable down-stop 218.

Legs 214 are attached to central bearing housing 210 using fasteners 220, which in this embodiment comprise bolts. Alternatively, legs 214 may be integral to central bearing housing 210. In some embodiments, legs 214 and central bearing housing 210 are constructed of aluminum. Legs 214 are further attached to trusses of internal frame 120 using spherical truss attachment bearings 222 and pins 224. Legs 214 can transfer thrust and torque loads to internal frame 120. Spherical truss attachment bearings 222 allow for moment alleviation and dynamic tuning.

In this embodiment, LIVE systems 200 are passive systems that comprise a fluid path that extends generally centrally through a central axis of the central bearing housing 210. More specifically, LIVE systems 200 comprise a fluid path comprising at least a central port 226 of the piston 208, interior reservoir of an upper end cap 228, and interior reservoir of a lower end cap 230. Upper end cap 228 and lower end cap 230 may be integral to central bearing housing 210 or they may be coupled thereto.

Figure 6:
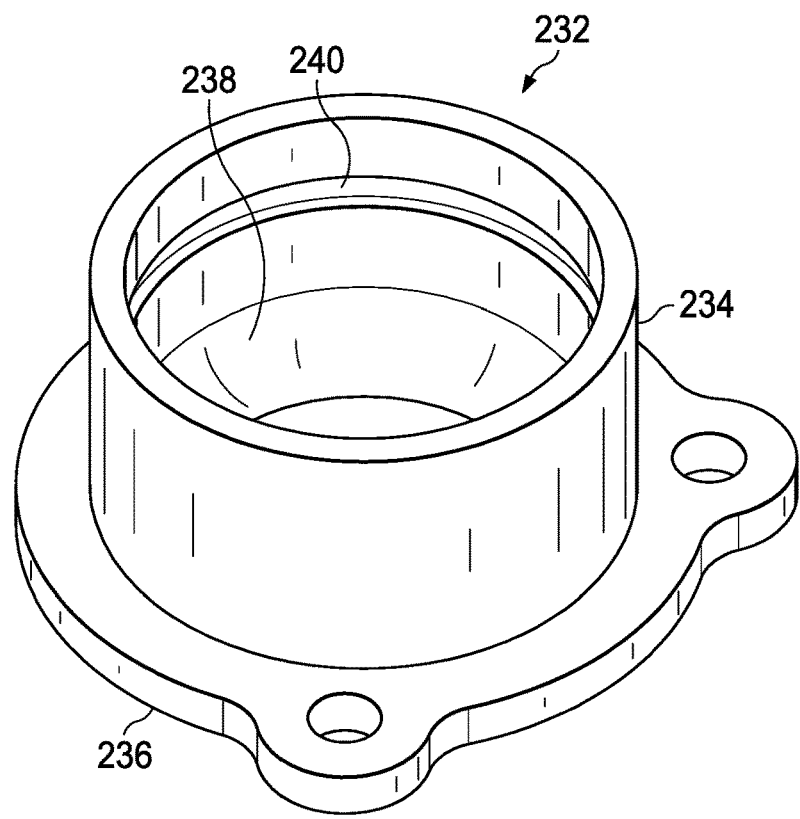
FIG. 6 is an oblique view of a spherical bearing housing of the LIVE systems of FIGS. 1-5.
Figure 7:
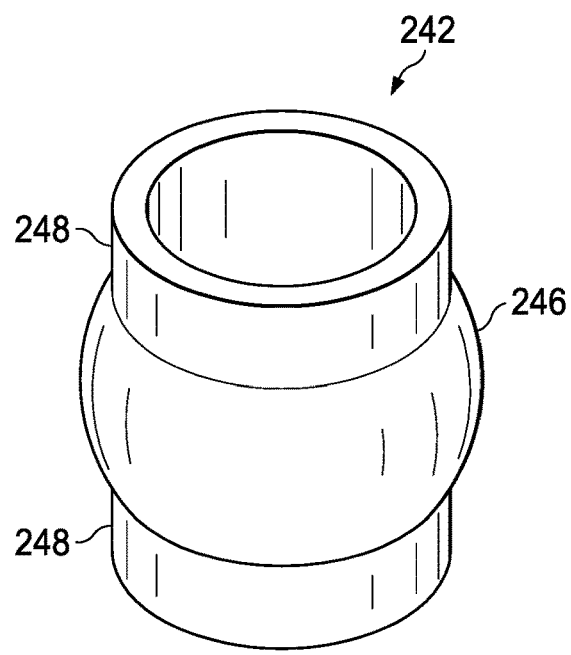
FIG. 7 is an oblique view of a spherical bearing center of the LIVE systems of FIGS. 1-5.
Figure 8:
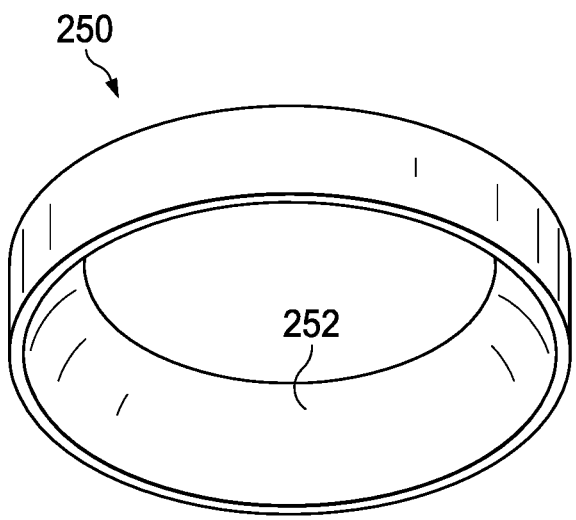
FIG. 8 is an oblique view of a spherical bearing retaining cap of the LIVE systems of FIGS. 1-5.

Referring now to FIG. 6, a spherical bearing housing 232 of spherical center bearing 206 is shown. Spherical bearing housing 232 generally comprises a tubular wall 234 attached to a flange plate 236. The inner profile of tubular wall 234 comprises a spherical interface 238 and an interior ledge 240. Referring now to FIG. 7, a spherical bearing center 242 comprises a central spherical portion 246 and upper and lower cylindrical portions 248. Referring now to FIG. 8, a spherical bearing retaining cap 250 is shown. Spherical bearing retaining cap 250 comprises a ring-like structure comprising a spherical interior profile 252. Most generally, spherical center bearing 206 can be constructed by inserting spherical bearing center 242 into spherical bearing housing 232 so that central spherical portion 246 contacts and/or is offset from spherical interface 238. Next, spherical bearing retaining cap 250 can be inserted into spherical bearing housing 232 until spherical bearing retaining cap 250 contacts interior ledge 240 and central spherical portion 246 contacts and/or is offset from spherical interior profile 252. In some cases, once central spherical portion 246 is captured between spherical bearing housing 232 and spherical bearing retaining cap 250 as described above, an elastomer can be injected and/or molded around central spherical portion 246. In some cases, spherical bearing housing 232 when attached to bridge beam 202 and bridge cap 204 using flange plate 236 allows the weight of fuselage 102 to provide vertical preloading thereby reducing required fastener loads. Additionally, flange plate 236 allows for easy vertical shimming of transmission 118, which can aid in driveshaft alignment.

In some embodiments, an adjustable density fluid may be utilized to facilitate dynamic tuning of LIVE system 200. Dynamic tuning may also be accomplished by including an adjustable orifice in the tuning port that modifies the cross-sectional area thereof. Further, while the embodiment shown is a passive system, in alternative embodiments, an active pumping mechanism (such as a piezo electric based pump) may be utilized to improve vibration isolation performance for a variety of transmission, engine, and/or rotor RPMs. In some cases, the active pumping/forcing mechanism can be integrated into the fluid flow path.

During operation of LIVE systems 200, the introduction of a force into piston 208 translates piston 208 relative to upper end cap 228 and lower end cap 230. Such a displacement of piston 208 forces tuning fluid that is disposed within the fluid flow path to move through central port 226 in the opposite direction of the displacement of piston 208. Such a movement of tuning fluid produces an inertial force that cancels, or isolates, the force from piston 208. During typical operation, the force imparted on piston 208 is oscillatory; therefore, the inertial force of the tuning fluid is also oscillatory, the oscillation being at a discrete frequency, i.e., isolation frequency.

The isolation frequency ($f_i$) of LIVE systems 200 can be represented by the following equation:

$$f_i = \frac{1}{2\pi}\sqrt{\frac{K}{R(R-1)m_t}}$$

In the above equation, R represents the ratio of the functional area $A_p$ of piston 208 to the cross-sectional area $A_T$ inside central port 226. As such, $R=A_p/A_T$. The mass of the tuning fluid is represented by $m_t$. The combined spring rate of elastomer members, for example the elastomer members of journal bearings 212, is represented by K.

Figure 9:
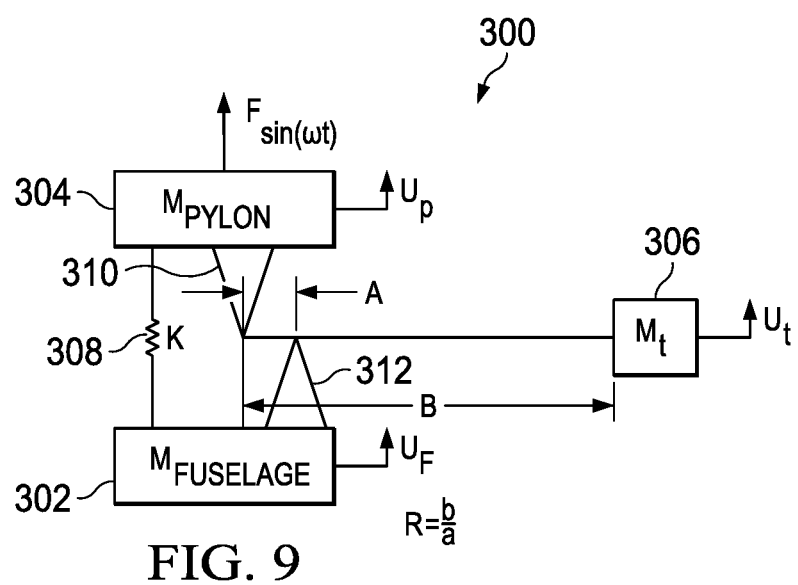
FIG. 9 is a mechanical equivalent force diagram of the LIVE systems of FIGS. 1-5.

Referring briefly to FIG. 9, a mechanical equivalent model 300 for LIVE system 200 is illustrated. In mechanical equivalent model 300, a box 302 represents the mass of a fuselage $M_{fuselage}$; a box 304 represents the mass of a pylon assembly $M_{pylon}$; and a box 306 represents the mass of a tuning mass $m_t$, in this case, the mass of the tuning fluid. A vibratory force $F \cdot \sin(\omega t)$ is generated by the transmission and propulsion system. Force $F \cdot \sin(\omega t)$ is a function of the frequency of vibration of the transmission and propulsion system.

Force $F \cdot \sin(\omega t)$ causes an oscillatory displacement up of the pylon assembly; an oscillatory displacement of the fuselage $u_f$; and an oscillatory displacement of the tuning mass $u_t$. Elastomer members are schematically represented by a spring 308 disposed between the fuselage $M_{fuselage}$ and the pylon assembly $M_{pylon}$. Spring 308 has a spring constant K.

In mechanical equivalent model 300, tuning mass $M_t$ functions as if cantilevered from a first fulcrum 310 attached to the pylon assembly $M_{pylon}$, and a second fulcrum 312 attached to the fuselage $M_{fuselage}$. The distance A from first fulcrum 310 to second fulcrum 312 represents the cross-sectional area of the above-described tuning port 226, and the distance B from first fulcrum 310 to the tuning mass $m_t$ represents the effective cross-sectional area of piston 208, such that an area ratio, or hydraulic ratio, R is equal to the ratio of B to A. Mechanical equivalent model 300 leads to the following equation of motion for the system:

$$\begin{bmatrix} M_{pylon}+(R-1)^2 M_t & -R(R-1)M_t \\ -R(R-1)M_t & M_{fuselage}+R^2 M_t \end{bmatrix}\begin{Bmatrix} \ddot{u}_p \\ \ddot{u}_f \end{Bmatrix} + \begin{bmatrix} K & -K \\ -K & K \end{bmatrix}\begin{Bmatrix} u_p \\ u_f \end{Bmatrix} = \begin{Bmatrix} F\sin(\omega t) \\ 0 \end{Bmatrix}$$

As is evident, it is desirable to have a large hydraulic ratio R, i.e., a large area of piston 208 and a small cross-sectional area of central port 226. It is also desirable to have a large tuning mass. In order to hold a large tuning mass and maintain a small cross-sectional area, the tuning port, central port 226, must be long.

Figure 10:
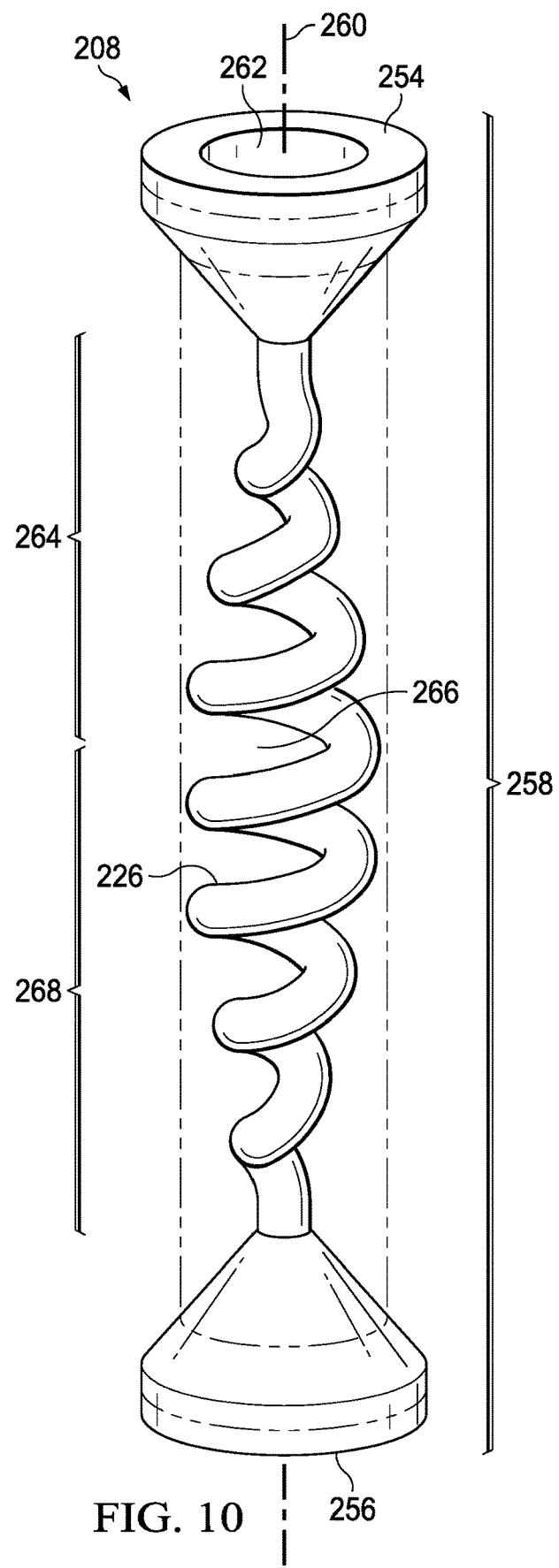
FIG. 10 is an oblique view of a piston of the LIVE systems of FIGS. 1-5.

FIG. 10 shows piston 208 in isolation with the body shown as transparent so as to make central port 226 visible. Piston 208 includes a first end 254, an opposite second end 256, a height 258 extending therebetween, and a central longitudinal axis 260 along which piston 208 translates within central bearing housing 210. Central port 226 may include a first tapered opening 262 extending from first end 254 and a second tapered opening extending from second end 256. While not shown, the second tapered opening is substantially similar to the first tapered opening 262. Central port 226 may include a first section 264 extending from first tapered opening 262 to a lengthwise midpoint 266 of piston 208 and a second section 268 extending from the second tapered opening to the midpoint 266 of piston 208. First and second sections 264, 268 initially extend from their origins of the first tapered opening 262 and the second tapered opening, respectively, along paths that are substantially parallel to central longitudinal axis 260. The closer first and second sections 264, 268 get to the midpoint 266 of piston 208, they increasingly deviate from parallel relative to the longitudinal axis 260 at progressively larger angles. The increasing deviation from parallel relative to the longitudinal axis 260 results in the first and second sections 264, 268 being disposed along paths with associated increasing radial distances from the longitudinal axis 260. First tapered opening 262 and the second tapered opening allow for a smooth transfer of the tuning fluid from interior reservoir of upper end cap 228 and interior reservoir of lower end cap 230, respectively. In addition, the progressive angling of central port 226 serves the same purpose.

The present disclosure is not limited to the embodiment of central port 226. Any tuning port that facilitates a length of the tuning port being longer than a longitudinal distance over which the port extends is within the scope of this disclosure. The tuning port length being defined as the overall distance of the fluid flow path from the first end of the piston to the second end of the piston. Moreover, the piston may include multiple tuning ports, the length of at least one of the tuning ports being longer than a longitudinal distance over which the at least one tuning port extends.

Figure 11:
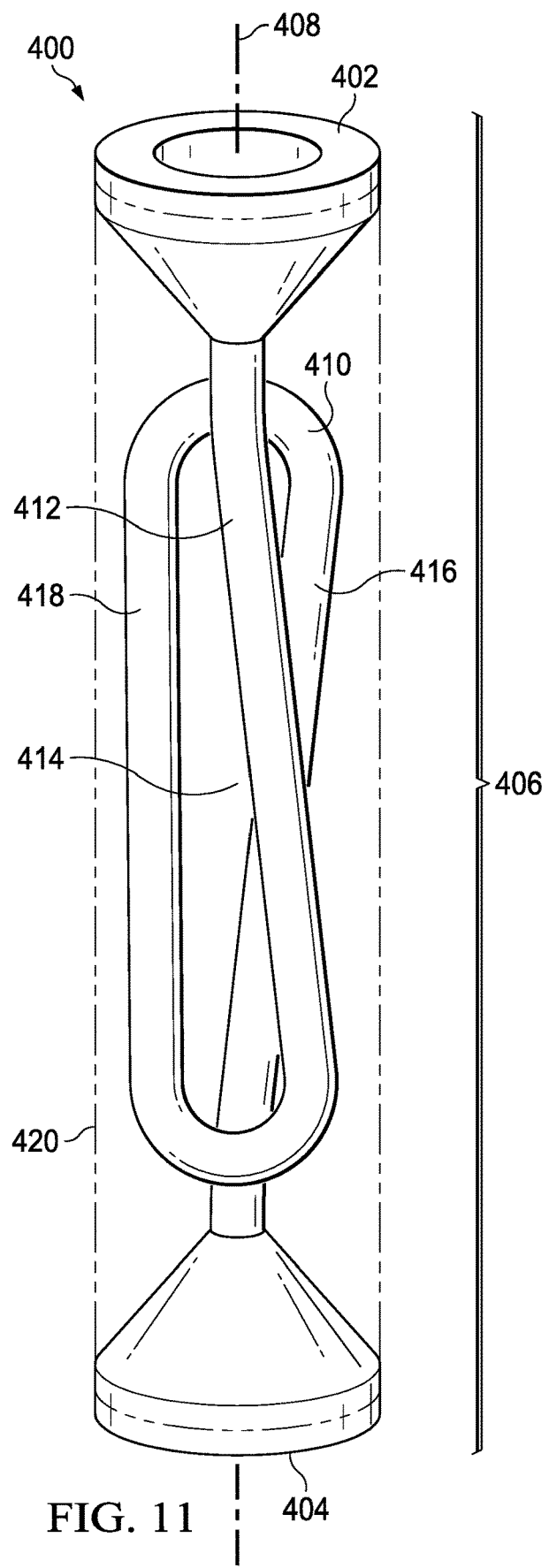
FIG. 11 is an oblique view of another piston according to an embodiment of this disclosure.

As shown in FIG. 11, an alternative piston 400 for use with LIVE systems 200. Piston 400 includes a first end 402, an opposite second end 404, a height 406 extending therebetween, and a central longitudinal axis 408 along which piston 400 translates within central bearing housing 210. Piston 400 further includes a tuning port 410 that include three sections: a first section 412 extending from first end 402 of piston 400 to a point between a lengthwise midpoint 414 of piston 400 and second end 404; a second section 416 extending from second end 404 to a point between midpoint 414 and first end 402; and a third section 418 connecting first section 412 and second section 416. First and second sections 412, 416 may be angled away from central longitudinal axis 408 toward opposite sides of an exterior surface 420 of piston 400 to maximize the radius of their connections with third section 418. In this configuration first, second, and third sections 412, 416, 418 may be substantially non-parallel along their respective lengths.

While the LIVE systems 200 are described above as being utilized in a helicopter 100, the LIVE systems 200 can alternatively be utilized in any vehicle subject to large oscillatory forces at one discrete frequency, or a relatively narrow band of frequencies. For example, vehicles incorporating rotating machinery operating at one or more fixed speeds or speeds that vary across a relatively narrow range of speeds can utilize LIVE systems 200 to isolate vibration.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A piston for use in a liquid inertia vibration elimination ("LIVE") system, comprising:
   a body having a first end, a second end, a height extending from the first end to the second end, and a central longitudinal axis extending through the first and second ends, the body defining a single port extending from the first end of the body to the second end of the body, wherein a length of the port is greater than the height of the body;
   wherein the single port includes a first opening and a second opening, at least one of the first opening and the second opening being located along a central lengthwise axis of the body.

2. The piston of claim 1, wherein the first opening includes a first tapered opening extending from the first end of the body and the second opening includes a second tapered opening extending from the second end of the body.

3. The piston of claim 2, wherein at least a portion of the port is generally helical.

4. The piston of claim 3, further comprising:
   a first section of the port extending from the first tapered opening to a midpoint of the body, the first section being substantially parallel to the central longitudinal axis of the body proximate the first tapered opening and deviating from parallel at progressively larger angles closer to the midpoint of the body; and
   a second section of the port extending from the second tapered opening to the midpoint of the body, the second section being substantially parallel to the central longitudinal axis of the body proximate the second tapered opening and deviating from parallel at progressively larger angles closer to the midpoint of the body.

5. The piston of claim 4, wherein the port between the first and second tapered openings has a uniform cross-sectional area along the length thereof.

6. The piston of claim 2, further comprising:
   a first section of the port extending from the first tapered opening to a point between a midpoint of the body and the second end of the body;
   a second section of the port extending from the second tapered opening to a point between the midpoint of the body and the first end of the body; and
   a third section of the port connecting the first section of the port and the second section of the port.

7. The piston of claim 6, wherein the first section of the port, the second section of the port, and the third section of the port are non-parallel to each other along a majority of their respective lengths.

8. A liquid inertia elimination ("LIVE") system, comprising:
   a piston having a first end, a second end, a height extending from the first end to the second end, and a central longitudinal axis extending through the first and second ends, the piston defining a port extending from the first end to the second end, wherein a length of the port is greater than the height of the piston, wherein the port comprises a unitary tubular structure; and
   a housing coupled to the piston such that the piston may translate relative to the housing along the central longitudinal axis of the piston, the housing defining a first reservoir in communication with the port and a second reservoir in communication with the port.

9. The LIVE system of claim 8, wherein the port includes a first tapered opening extending from the first end of the piston and a second tapered opening extending from the second end of the piston.

10. The LIVE system of claim 9, wherein at least a portion of the port is generally helical.

11. The LIVE system of claim 10, further comprising:
    a first section of the port extending from the first tapered opening to a midpoint of the piston, the first section being substantially parallel to the central longitudinal axis of the piston proximate the first tapered opening and deviating from parallel at progressively larger angles closer to the midpoint of the piston; and a second section of the port extending from the second tapered opening to the midpoint of the piston, the second section being substantially parallel to the central longitudinal axis of the piston proximate the second tapered opening and deviating from parallel at progressively larger angles closer to the midpoint of the piston.

12. The LIVE system of claim 11, wherein the port between the first and second tapered openings has a uniform cross-sectional area along the length thereof.

13. The LIVE system of claim 12, wherein the piston is configured to be coupled to a source of oscillatory forces and the housing is configured to be coupled to a structure to be isolated from oscillatory forces.

14. The LIVE system of claim 12, wherein the housing is configured to be coupled to a source of oscillatory forces and the piston is configured to be coupled to a structure to be isolated from oscillatory forces.

15. The LIVE system of claim 8, further comprising:
a central spherical bearing configured to receive the piston therethrough, the central spherical bearing being configured to be coupled to a source of oscillatory forces and allow the source of oscillatory forces to rotate relative to the piston.

16. The LIVE system of claim 15, further comprising:
a first bearing proximate the first end of the piston, the first bearing separating the piston from the housing; and
a second bearing proximate the second end of the piston, the second bearing separating the piston from the housing;
wherein the first and second bearings facilitate translation of the piston relative to the housing.

17. An aircraft, comprising:
a frame;
a transmission; and
a liquid inertia vibration elimination ("LIVE") system coupled between the frame and the transmission, the LIVE system being configured to attenuate communication of vibrations from the transmission to the frame, the LIVE system, comprising:
a piston having a first end, a second end, a height extending from the first end to the second end, and a central longitudinal axis extending through the first and second ends, the piston defining a port extending from the first end of the piston to the second end of the piston, wherein a length of the port is greater than the height of the piston; and
a housing coupled to the piston such that the piston may translate relative to the housing along the central longitudinal axis of the piston, the housing defining a first reservoir in communication with the port and a second reservoir in communication with the port;
wherein the piston comprises at least one opening located along the central longitudinal axis.

18. The aircraft of claim 17, wherein at least a portion of the port is generally helical.

19. The aircraft of claim 18, wherein the piston of the LIVE system is coupled to the transmission and the housing is coupled to the frame.

20. The aircraft of claim 19, further comprising:
a central spherical bearing configured to permit rotation of the transmission relative to the piston;
a first bearing proximate the first end of the piston, the first bearing separating the piston from the housing; and
a second bearing proximate the second end of the piston, the second bearing separating the piston from the housing;
wherein the first and second bearings facilitate translation of the piston relative to the housing.

\* \* \* \* \*